(12) United States Patent
Keohane et al.

(10) Patent No.: US 6,983,352 B2
(45) Date of Patent: Jan. 3, 2006

(54) SYSTEM AND METHOD FOR POINT IN TIME BACKUPS

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/464,877

(22) Filed: Jun. 19, 2003

(65) Prior Publication Data

US 2004/0260894 A1   Dec. 23, 2004

(51) Int. Cl.
G06F 12/16 (2006.01)
(52) U.S. Cl. .................. 711/162; 714/6; 714/5
(58) Field of Classification Search ........... 707/200, 707/201, 202, 203, 204, 205; 714/1, 2, 5, 714/6, 7, 8, 13, 20; 711/161, 162, 156, 147
See application file for complete search history.

(56) References Cited

U.S. PATENT DOCUMENTS

| 5,495,587 | A | * | 2/1996 | Comfort et al. ............ 712/228 |
|---|---|---|---|---|
| 5,500,806 | A | * | 3/1996 | Bellin et al. ................. 700/298 |
| 5,668,991 | A | * | 9/1997 | Dunn et al. .................. 707/202 |
| 5,724,581 | A | * | 3/1998 | Kozakura ..................... 707/202 |
| 5,974,429 | A | * | 10/1999 | Strub et al. .................. 707/203 |
| 6,047,294 | A | * | 4/2000 | Deshayes et al. ........... 707/204 |
| 6,490,598 | B1 | * | 12/2002 | Taylor ......................... 707/204 |
| 6,662,198 | B2 | * | 12/2003 | Satyanarayanan et al. .. 707/204 |
| 6,691,245 | B1 | * | 2/2004 | DeKoning ..................... 714/6 |
| 6,732,125 | B1 | * | 5/2004 | Autrey et al. ................ 707/204 |
| 6,738,757 | B1 | * | 5/2004 | Wynne et al. ................. 707/3 |
| 6,799,189 | B2 | * | 9/2004 | Huxoll ........................ 707/204 |
| 6,839,819 | B2 | * | 1/2005 | Martin ........................ 711/162 |
| 2003/0131253 | A1 | * | 7/2003 | Martin et al. ............... 713/200 |
| 2004/0107226 | A1 | * | 6/2004 | Autrey et al. ............... 707/204 |

OTHER PUBLICATIONS

"Schedule Program Diskette File Structure". IBM Technical Disclosure Bulletin, Jan. 1, 1987, vol. 29, issue 8, pp. 3508-3511.*

* cited by examiner

Primary Examiner—B. James Peikari
(74) Attorney, Agent, or Firm—VanLeeuwen & Vanleeuwen; Marilyn S. Dawkins

(57) ABSTRACT

A system and method for performing a point in time backup is presented. A backup application initiates a point in time backup whereupon a backup tracker monitors write requests during the point in time backup. The backup tracker logs data block locations that have already been backed up whose content changes in response to a write request. After a first pass of backing up data blocks, the backup application backs up the changed data blocks. During the changed data block backup procedure, the backup application invokes a copy on write command for particular changed data blocks that receive write requests prior to their content being backed up. The copy on write command stores the particular changed data block's content in a temporary storage area in which the backup application retrieves when the backup application is ready to backup the particular changed data blocks.

20 Claims, 7 Drawing Sheets

SYSTEM AND METHOD FOR POINT IN TIME BACKUPS

BACKGROUND OF THE INVENTION

1. Technical Field

The present invention relates in general to a system and method for point in time backups. More particularly, the present invention relates to a system and method for tracking data block content changes during a point in time backup and re-copying the data blocks whose content changed after their original content was backed up.

2. Description of the Related Art

Backing up data is an essential element of a computer system. Data, in many cases, is more valuable than the computer system and storage area in which the data resides. Backing up data on a regular basis is necessary in order to prevent the data from being lost due to power surges, malicious users, or accidental removal.

Point in time backups are a type of backup that copies data from a source location to a target location whereby the backup is valid for a particular point in time. The point in time backup's "timestamp" is at the end of its last data block copy. For example, if a point in time backup copies 50 data blocks to a backup storage location, the "timestamp" is at the end of the $50^{th}$ data block copy. A challenge found, however, is that source location data blocks are changed in response to a write request that have been already copied to a target location. In turn, the point in time backup is not valid unless the changed data blocks are re-copied to the target location.

However, not all data blocks that change are required to be re-copied to the backup storage area. If a data block's content changed that has not yet been backed up, the changed data block is backed up during the point in time backup's first pass data block copy. For example, if the point in time backup has copied the first ten of fifty data blocks to a backup area and the twentieth data block changes, the point in time backup copies the twentieth data block to the backup storage area when it reaches the twentieth data block location. A challenge found, however, is identifying which data block changes are required to be re-copied to the backup area in order to create a valid point in time backup.

What is needed, therefore, is a system and method for tracking data block content changes during a point in time backup and re-copying the data blocks that changed after their content was backed up.

SUMMARY

It has been discovered that the aforementioned challenges are resolved by logging data block write requests based upon the progress of a point in time backup and re-copying changed data blocks after the first pass of the point in time backup. During the changed block re-copying process, processing issues a copy on write procedure to changed data blocks that receive a second write request.

A server invokes a point in time backup for particular data that is included in a source location. The data may be a file, a file system, or a complete database. A point in time backup is a procedure that backs up data for a particular point in time whereby its "timestamp" is at the end of the backup procedure. For example, if a point in time backup copies 50 data blocks to a backup storage location, the point in time backup's "timestamp" is at the end of the $50^{th}$ data block copy.

The server initiates a point in time backup by invoking a backup application. The backup application includes a backup tracker which monitors the progress of the point in time backup and also logs data block locations that have been backed up which receive write requests prior to the completion of the point in time backup. The backup tracker logs the data block locations corresponding to write requests because the changed data blocks are required to be re-copied to the backup storage area in order to generate a valid point in time copy.

The backup application retrieves data blocks from a source location and saves data blocks in a target location. The backup application may copy multiple data blocks during each copy cycle or the backup application may copy a single data block during each copy cycle. During the point in time backup process, a client may send a write request to the server. The backup tracker determines whether the client's write request corresponds to a data block that has already been copied to the target location. If the data block has already been copied, the backup tracker logs the data block location in a change log. For example, the backup application may have copied the first nine data blocks when the client sends a write request to the sixth data block. In this example, the backup tracker logs the sixth data block location for re-copying once the backup application is finished with its first pass data block backup.

Once the backup application completes its first pass of backing up data blocks, the backup application retrieves changed block locations from the change log. The backup application initiates a copy on write subroutine which monitors write requests and copies a changed data block's content to a temporary storage area if a write request corresponds to a changed data block location that is included in the change log. The backup application invokes the copy on write subroutine because in order to generate a valid point in time backup, the backup application needs to backup the changed data block's content without its content altering in response to a second write request.

The backup application retrieves changed data block locations from the change log and begins backing up the changed data blocks. During the changed data block backup process, a client may send a second write request to the server that corresponds to a particular changed data block. The backup tracker determines whether the changed data block has been copied to the temporary storage area. If not, the backup application performs a copy on write procedure for the particular changed data block whereby the particular changed data block is stored in a temporary storage area. Using the example described above, the client may send a second write request corresponding to the sixth data block location (e.g. a changed data block). In this example, the backup application has not yet reached the sixth data block location and, therefore, the sixth data block is copied to a temporary storage area before the second write request is executed in order to preserve the contents of the sixth data block.

When the backup application is ready to copy a changed data block to a backup storage area, the backup application identifies whether a copy on write was executed on the particular changed data. If a copy on write procedure was executed on the particular changed data block, the backup application retrieves the changed data block's contents from the temporary storage area and copies it to the target location. If a copy on write was not executed on the particular changed data block, the backup application retrieves the particular changed data block's contents from its original source location and copies it to the target location. After each of the changed data blocks has been backed up in the target location, the point in time backup is complete.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
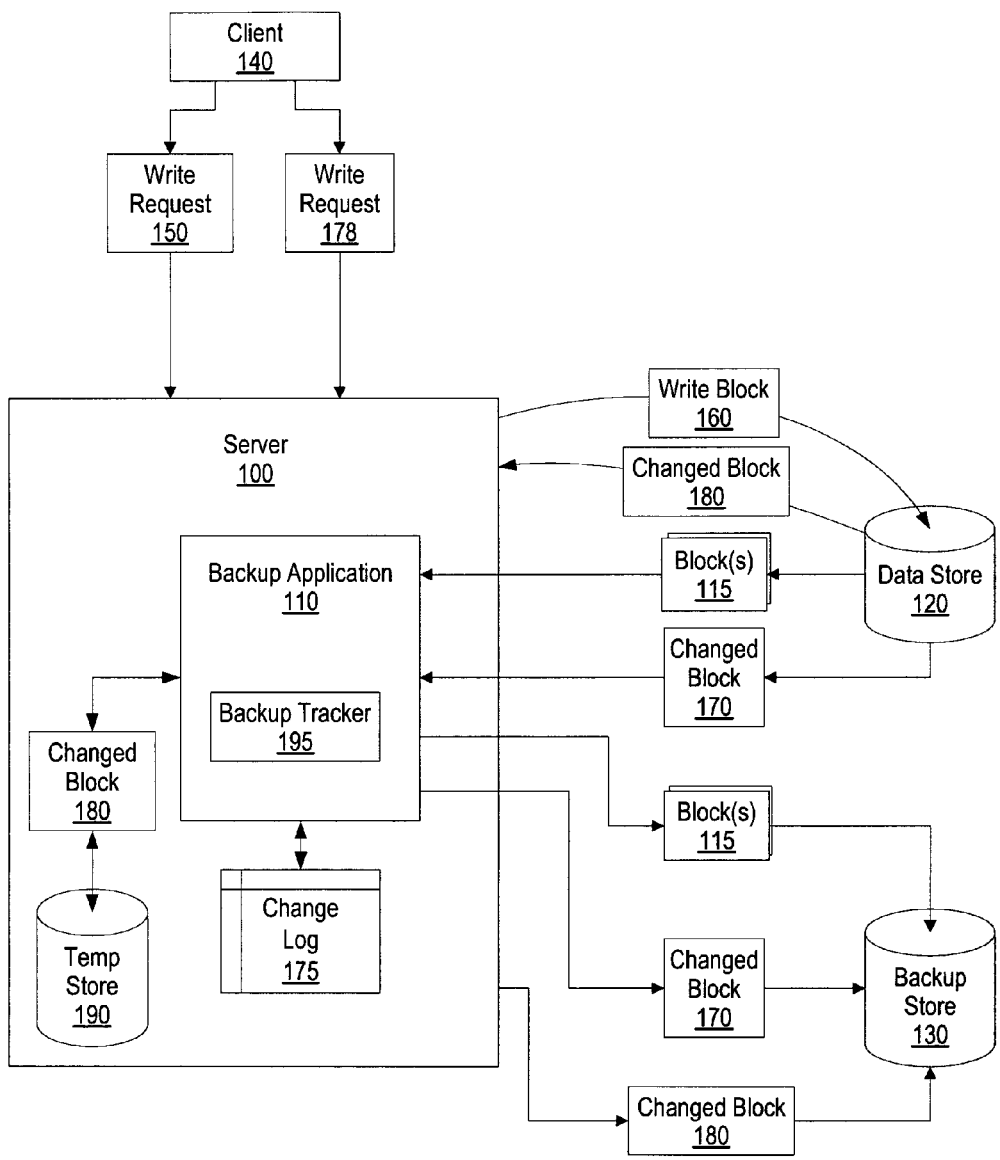
FIG. 1 is a diagram showing a server performing a point in time backup.

FIG. 1 is a diagram showing a server performing a point in time backup. Server 100 initiates a point in time backup for data included in data store 120. The data may be a file, a file system, or a complete database which server 100 backs up on a regular basis, such as daily. A point in time backup is a procedure that backs up data for a particular point in time whereby the time is at the end of the backup procedure. For example, if a point in time backup copies 50 data blocks to a backup storage location, the point in time's "timestamp" is at the end of the 50$^{th}$ data block copy. Data store 120 may be stored on a nonvolatile storage area, such as a computer hard drive.

Server 100 initiates a point in time backup by invoking backup application 110. Backup application 110 includes backup tracker 195 which monitors the progress of the point in time backup and also logs data block locations that have been backed up which receive a client's write request before a point in time backup's completion (see FIG. 5 and corresponding text for further details regarding backup tracker monitoring steps). Backup tracker 195 logs write requested data block locations because when a data block changes due to a write request after its contents have been copied, the data block is required to be re-copied to the backup storage area in order to have a valid point in time backup.

Backup application 195 starts a point in time backup and retrieves block(s) 115 from data store 120 and saves block(s) 115 in backup store 130. Backup application 110 may copy multiple data blocks during each copy cycle or backup application 110 may copy a single data block during each copy cycle. During the point in time backup process, client 140 sends write request 150 to server 100. Backup tracker 195 determines whether write request 150's corresponding data block has been backed up in backup store 130 (see FIG. 5 and corresponding text for further details regarding backup tracker monitoring). If the corresponding data block has already been backed up, backup tracker 195 logs the corresponding data block location in change log 165. Server 100 sends write block 160 to data store 120 in order to fulfill write request 150 thereby changing the contents of the corresponding data block. Change log 165 may be stored on a volatile or nonvolatile storage area, such as computer memory or a computer hard drive.

Once backup application 110 completes its first pass of backing up data blocks, backup application 110 retrieves changed data block locations from change log 165. Backup application 110 also initiates a copy on write subroutine for changed data block locations. Backup application 110 invokes a copy on write subroutine because in order to have a valid point in time backup, backup application 110 is required to backup the changed data blocks without their contents altering in response to a second write request (see FIG. 6 and corresponding text for further details regarding copy on write procedures).

Backup application 110 begins a changed block copying process whereupon client 140 sends a second write request (e.g. write request 175) to server 100 which corresponds to a changed data block's location. Backup application 110 determines whether the particular changed data block has been copied to backup store 130. If the particular changed data block has not been copied to backup store 130, backup application 110 performs a copy on write procedure to the corresponding changed data block by retrieving changed block 180 from data store 120 and storing changed block 180 in temporary store 190. Temporary store 190 may be stored on a nonvolatile storage area, such as a computer hard drive.

When backup application 110 reaches a particular changed data block's location to copy, backup application 110 identifies whether a copy on write procedure was executed on the particular changed data block. If a copy on write procedure was executed on the particular changed data block, the backup application retrieves the changed data block, such as changed block 180, from temporary store 190 and copies changed block 180 to backup store 130. If a copy on write procedure was not executed on the particular changed data block, the backup application retrieves the particular changed data block, such as changed block 170, from data store 120 and copies changed bloc 170 to backup store 130. After each of the changed data blocks has been backed up in backup store 130, backup application 110's point in time backup is complete.

Figure 2:
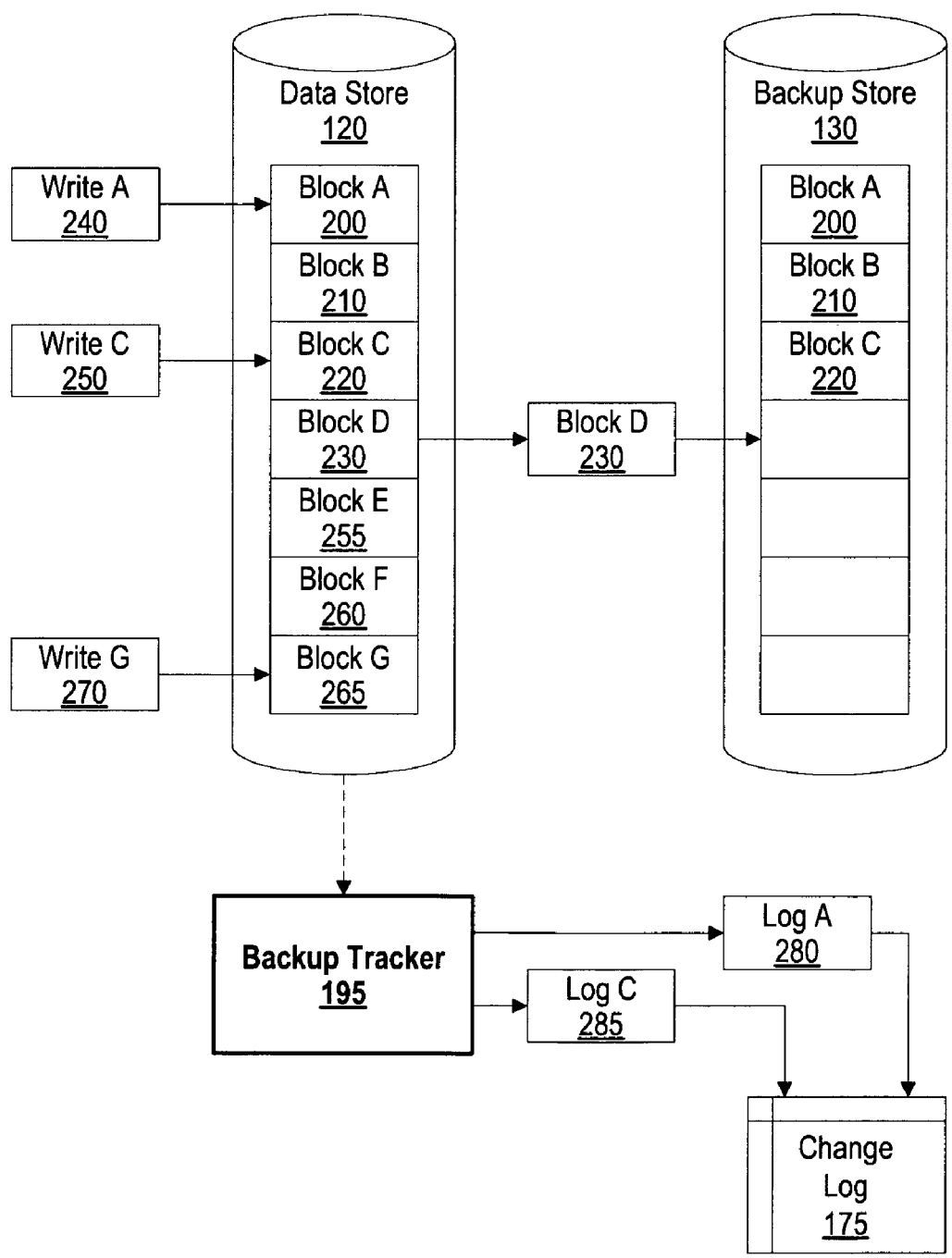
FIG. 2 is a diagram showing a backup tracker monitoring a point in time backup procedure and logging data block locations that receive block write requests whose content has been copied to a backup storage area.

FIG. 2 is a diagram showing a backup tracker monitoring a point in time backup procedure and logging data block locations that receive block write requests whose content has been copied to a backup storage area. FIG. 2 shows the point in time backup has copied block A 200, block B 210, and block C 220 from data store 120 to backup store 130. Data store 120 and backup store 130 are the same as data store 120 and backup store 130 shown in FIG. 1.

The point in time backup is in process of copying block D 230 from data store 120 when three write requests occur which are write A 240, write C 250, and write G 270. Backup tracker 195 determines that block A 200 and block C 220 have already been copied to backup store 130 and, therefore, logs their locations in change log 165 (e.g. log A 280 and log C 285). Backup tracker 195 and change log 165 are the same as backup tracker 195 and change log 165 shown in FIG. 1. Backup tracker 195 does not log information corresponding to write G 270 because the point in time backup has not yet backed up block G 265 and block G 265's data is copied to backup store 130 when the point in time backup reaches block G 265.

Figure 3:
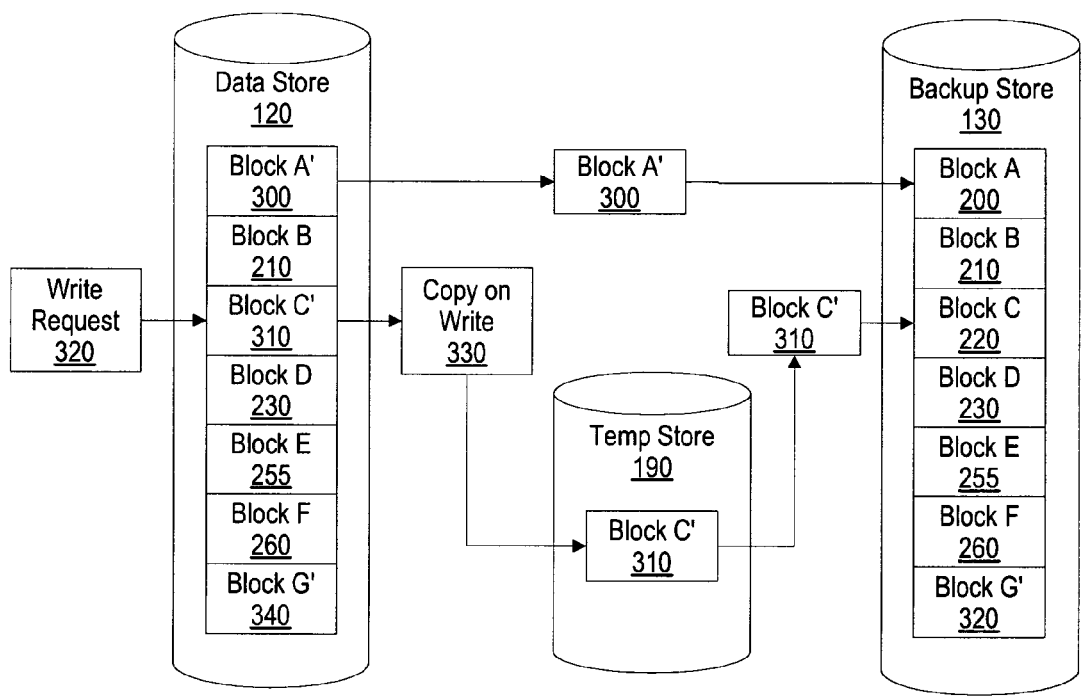
FIG. 3 is a diagram showing changed data blocks being backed up in order to complete a point in time backup procedure.

Once the backup application is finished backing up each data block included in data store 120, the backup application uses changed data block location information included in change log 165 to backup the changed data block locations (see FIG. 3 and corresponding text for further details regarding changed data block backups).

FIG. 3 is a diagram showing data blocks being backed up in order to complete a point in time backup procedure. A backup application initiated a point in time backup whereupon the original contents of data store 120 were copied to backup store 130. During the backup process, block A 200 and block C 220 were backed up in backup store 130. However, the contents of both data block locations were changed in data store 120 in response to write requests (see FIG. 2 and corresponding text for further details). Data store 120 and backup store 130 are the same as data store 120 and backup store 130 shown in FIG. 2. Block B 210, block D 230, block E 255, and block F 260 are the same as that shown in FIG. 2. Block G' 340 received a write request during the first pass of the point in time backup. However, the write request occurred prior to block G' 340 being backed up and, therefore, block G' 340's content was backed up in backup store 130 during the point in time backup's first pass (see FIG. 2 and corresponding text for further details regarding initial point in time backup processes).

Processing retrieves a change log file and identifies that block A' 300 and block C' 310 should be copied to backup store 130 in order to complete the point in time backup. Processing copies block A' 300 to backup store 130 to replace block A 200. During the copying process, block C' 310 receives write request 320. In order to preserve the contents of block C' 310, processing performs copy on write 330 which stores the contents of block C' 310 in temporary storage 190. When processing is ready to copy the contents of block C' 310 to backup store 130, processing identifies that block C' 310 received a copy on write command and, in turn, processing retrieves block C' 310 from temporary storage 190 and saves it in backup store 130.

Figure 4:
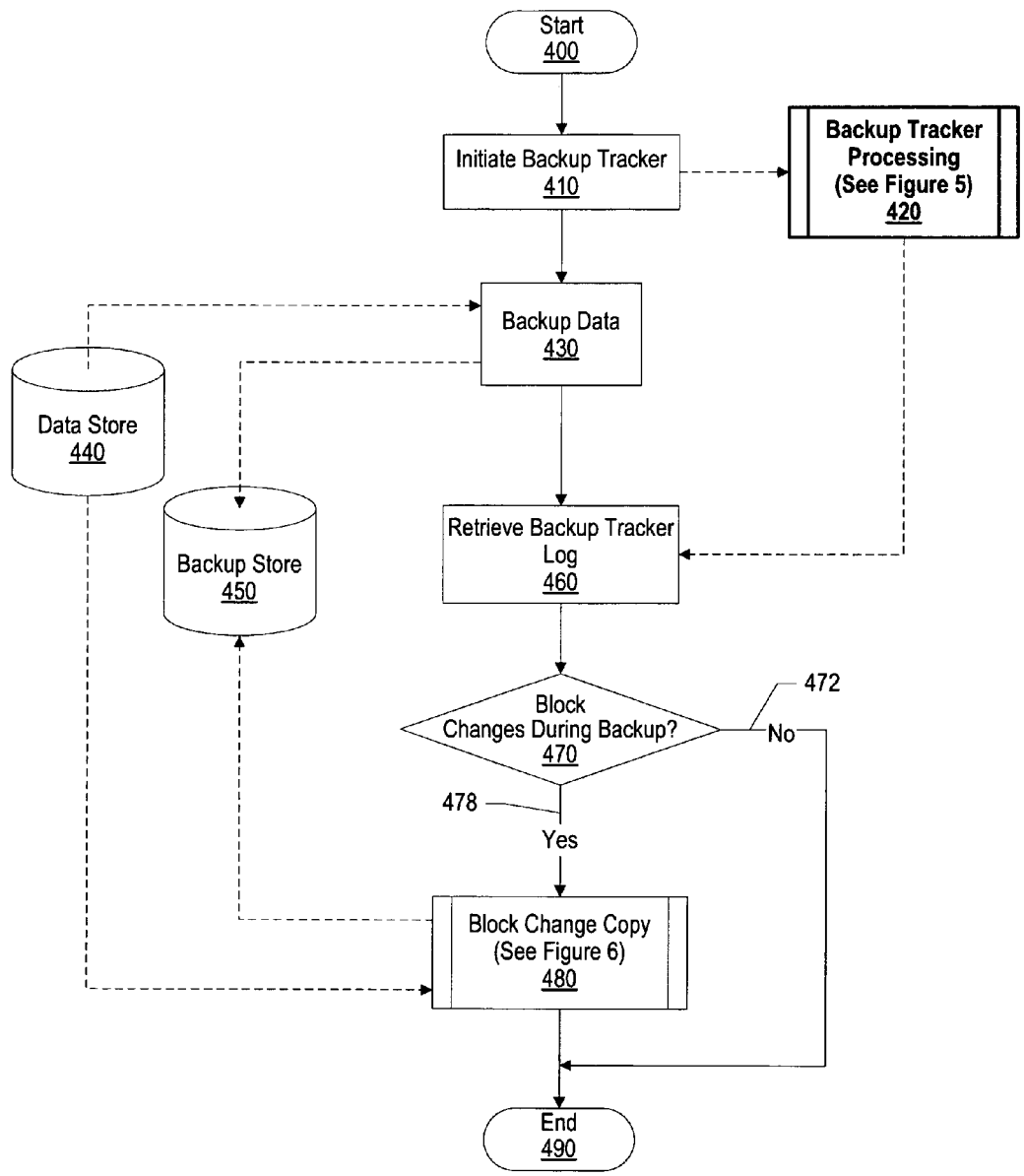
FIG. 4 is a flowchart showing steps taken in a backup application performing a point in time backup and a backup tracker logging changed data blocks that require re-copying after a point in time backup's first pass.

FIG. 4 is a flowchart showing steps taken in a backup application performing a point in time backup and a backup tracker logging changed data blocks that require re-copying after a point in time backup's first pass. Processing commences at 400, whereupon processing initiates a backup tracker at step 410. The backup tracker monitors data block write requests and logs data block locations that are already copied to a backup storage area during the point in time backup.

Processing initiates the point in time backup and copies data blocks from data store 440 and saves the data blocks in backup store 450 (step 430). Processing copies each data block from data store 440 that correspond to particular data (i.e. a file, a file system, a database, etc.) to backup store 450 until each data block is copied. Data store 440 and backup store 450 may be stored on a nonvolatile storage area, such as a computer hard drive.

Processing retrieves a change log from the backup tracker at step 460. The change log includes data block locations whose contents were changed after the contents have been copied to backup store 450 but prior to the completion of the point in time backup. For example, processing may have copied the first ten of fifty data blocks of a particular file and the third data block is changed. In this example, the third data block location is logged into the change log because the third data block needs to be re-copied to backup store 450 in order to have a valid point in time backup.

A determination is made as to whether the change log includes data block locations that require re-copying (decision 470). Using the example described above, the change log includes the third data block location which informs processing to re-copy the third data block location to backup store 450. If one or more data blocks changed during the point in time backup, decision 470 branches to "Yes" branch 478 whereupon processing copies the changed data blocks whose locations are included in data store 440 to backup store 450 (see FIG. 6 and corresponding text for further details). On the other hand, if no data blocks changed during the point in time backup, decision 470 branches to "No" branch 472 bypassing changed block-copying steps. Processing ends at 490.

Figure 5:
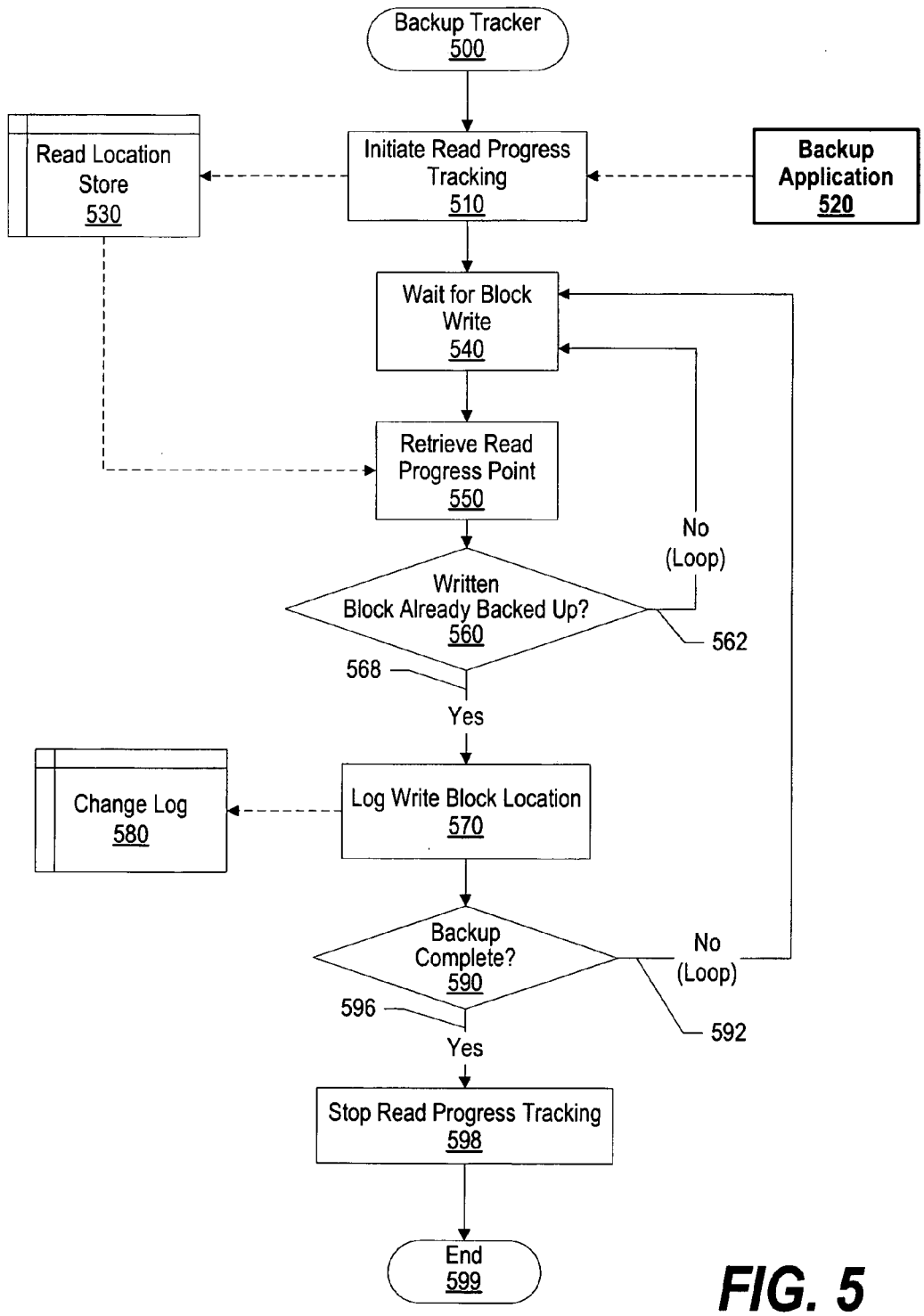
FIG. 5 is a flowchart showing steps taken in a backup tracker monitoring the progress of a point in time backup and logging data block locations whose contents change after they are copied to a backup storage area.

FIG. 5 is a flowchart showing steps taken in a backup tracker monitoring the progress of a point in time backup and logging data block locations whose contents change subsequent to their original content being copied to a backup storage area. Processing commences at 500, whereupon processing initiates read progress tracking (step 510). Read progress tracking monitors the progress of backup application 520's point in time backup and stores its progress in read location store 530. For example, backup application 520 may be copying a total of fifty data blocks for a particular point in time backup and backup application 520 has copied ten of the fifty blocks. In this example, processing stores information in read location store 530 corresponding to the tenth data block, such as a pointer. Read location store 530 may be stored on a volatile or nonvolatile storage area, such as computer memory or a computer hard drive.

Processing waits for a write request from a client at step 540. Once processing receives a write request, processing retrieves a read progress point (i.e. a pointer location) from read location store 530 at step 550. Using the example described above, processing retrieves information that corresponds to the tenth data block. A determination is made as to whether the data block that corresponds to the write request has already been copied to a backup storage area (decision 560). Using the example described above, if the write request corresponds to the ninth data block, the ninth data block has already been copied to the backup storage area since the read progress point is currently at the tenth data block.

If the write request does not correspond to a data block that has already been copied, processing is not required to log the corresponding data block location and decision 560 branches to "No" branch 562 which loops back to wait for another write request. Processing does not log a data block location that has not yet been copied because the data block is copied with changes during the first pass point in time backup procedure. Using the example described above, a write request may correspond to the $20^{th}$ data block which, when the point in time backup procedure reaches the $20^{th}$ data block, copies its contents to the backup storage area which includes the changes that resulted from the write request. This looping continues until processing receives a write request that corresponds to a data block whose content has been copied to a backup storage area, at which point decision 560 branches to "Yes" branch 568.

Processing logs the data block location that corresponds to the write request in change log 580 (step 570). Change log 580 may be stored on a volatile or nonvolatile storage area, such as computer memory or a computer hard drive. A determination is made as to whether backup application 520 is finished with its point in time backup (decision 590). If backup application 520 is not finished with its point in time backup, decision 590 branches to "No" branch 592 which loops back to wait for the next block request. This looping continues until backup application 520 is finished with its point in time backup, at which point decision 590 branches to "Yes" branch 596 whereupon processing stops read progress tracking (step 598), and returns at 599. At this point, change log 580 includes a list of each changed data block locations that require re-copying in order to create a valid point in time backup.

Figure 6:
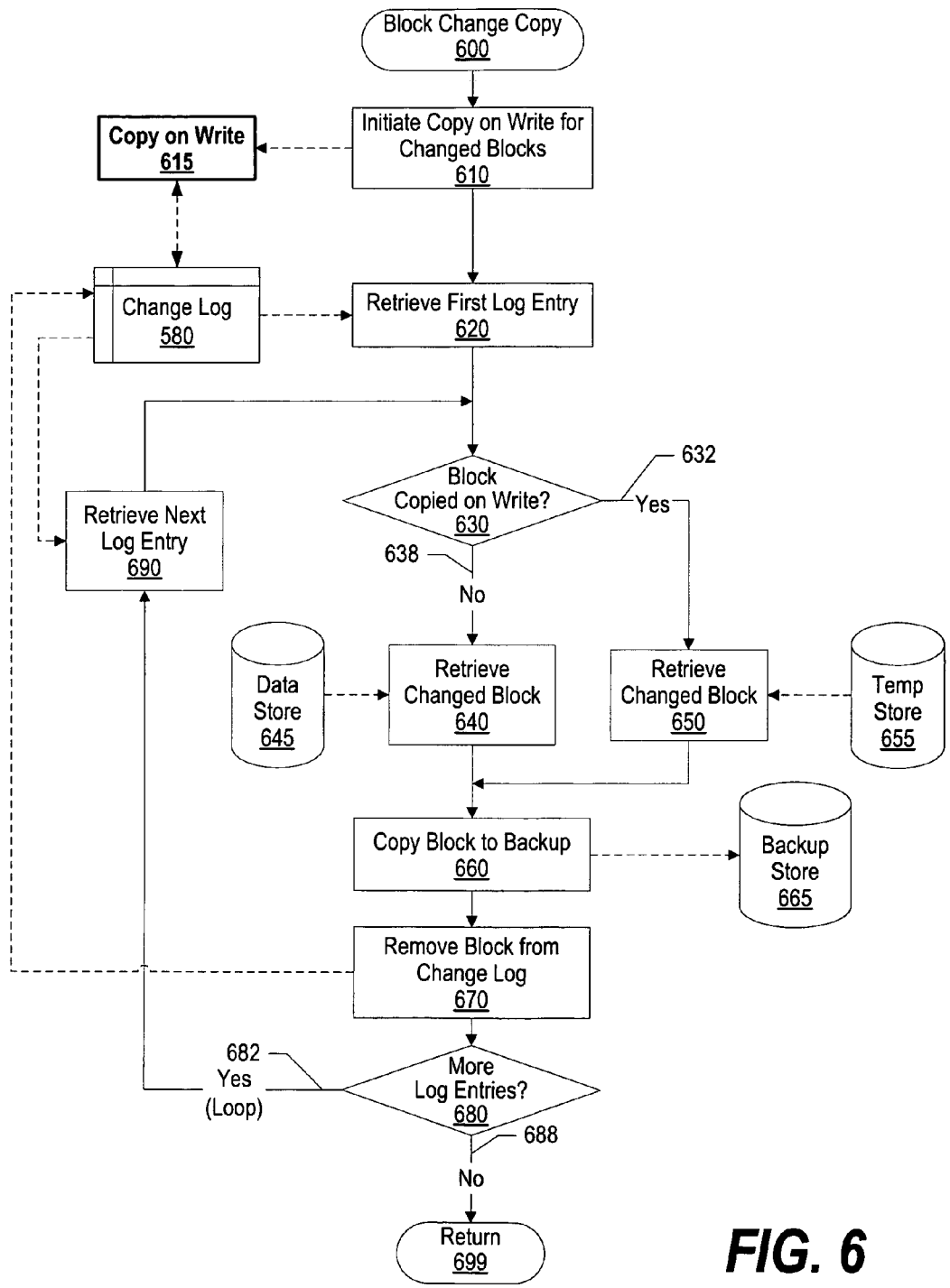
FIG. 6 is a flowchart showing steps taken in backing up changed data blocks and performing a copy on write command in response to a write request that corresponds to one of the changed data block locations that are not yet backed up.

FIG. 6 is a flowchart showing steps taken in backing up changed data blocks and performing a copy on write command in response to a write request that corresponds to one of the changed data block locations that are not yet backed up. Processing commences at 600, whereupon processing initiates copy on write 615 at step 610. Copy on write 615 is a subroutine that monitors changed data block locations which are included in change log 580, and copies the changed data block to a temporary storage area in response to receiving a write request that corresponds to one of the changed data blocks. Copy on write 615 is initiated because each changed data block's content is preserved until it is copied to the backup storage area in order to generate a valid point in time backup. Change log 580 is the same as change log 580 shown in FIG. 5 and may be stored on a volatile or nonvolatile storage area, such as computer memory or a computer hard drive.

Processing retrieves a first log entry from change log 580 at step 620. Change log 580 includes a list of data block locations whose contents changed during a first pass of a point in time backup (see FIG. 5 and corresponding text for further details regarding the logging of changed data blocks). A determination is made as to whether a changed data block corresponding to the retrieved log entry has been copied to a temporary storage location in response to a write request (e.g. copy on write command) (decision 630). For example, change log 580 may include data block 15 whereby data block 15 received a write request prior to being re-copied to a backup storage area. In this example, data block 15 is copied to a temporary storage area prior to executing the write request. In one embodiment, copy on write 615 sets a flag in change log 580 that corresponds to a copy on write procedure for a particular changed data block. In this embodiment, processing identifies the flag value in order to determine whether a particular changed data block location has been copied to a temporary storage area.

If the changed data block has been copied to a temporary storage area, decision 630 branches to "Yes" branch 632 whereupon processing retrieves the changed data block contents from temporary store 655 (step 650). Temporary store 655 may be stored on a nonvolatile storage area, such as a computer hard drive. On the other hand, if the changed data block has not been copied to a temporary storage area, decision 630 branches to "No" branch 638 whereupon processing retrieves the changed data block contents from its original location, such as data store 645 (step 640). Data store 645 may be stored on a nonvolatile storage area, such as a computer hard drive.

Processing copies the changed data block to backup store 665 at step 660. In one embodiment, processing may copy the changed data block to the original point in time backup file. In another embodiment, processing may copy the changed data block to a file that is separate from the original point in time backup. Backup store 665 may be stored on a nonvolatile storage area, such as a computer hard drive.

Processing removes the changed data block location from change log 580 at step 670. The changed data block location is removed because the changed data block no longer requires a copy on write action since the changed data block has been copied to backup store 665. A determination is made as to whether change log 580 includes more log entries (decision 680). If change log 580 includes more log entries, decision 680 branches to "Yes" branch 682 which loops back to retrieve (step 690) and process the next log entry. This looping continues until change log 580 does not include more log entries, at which point decision 680 branches to "No" branch 688 whereupon processing returns.

Figure 7:
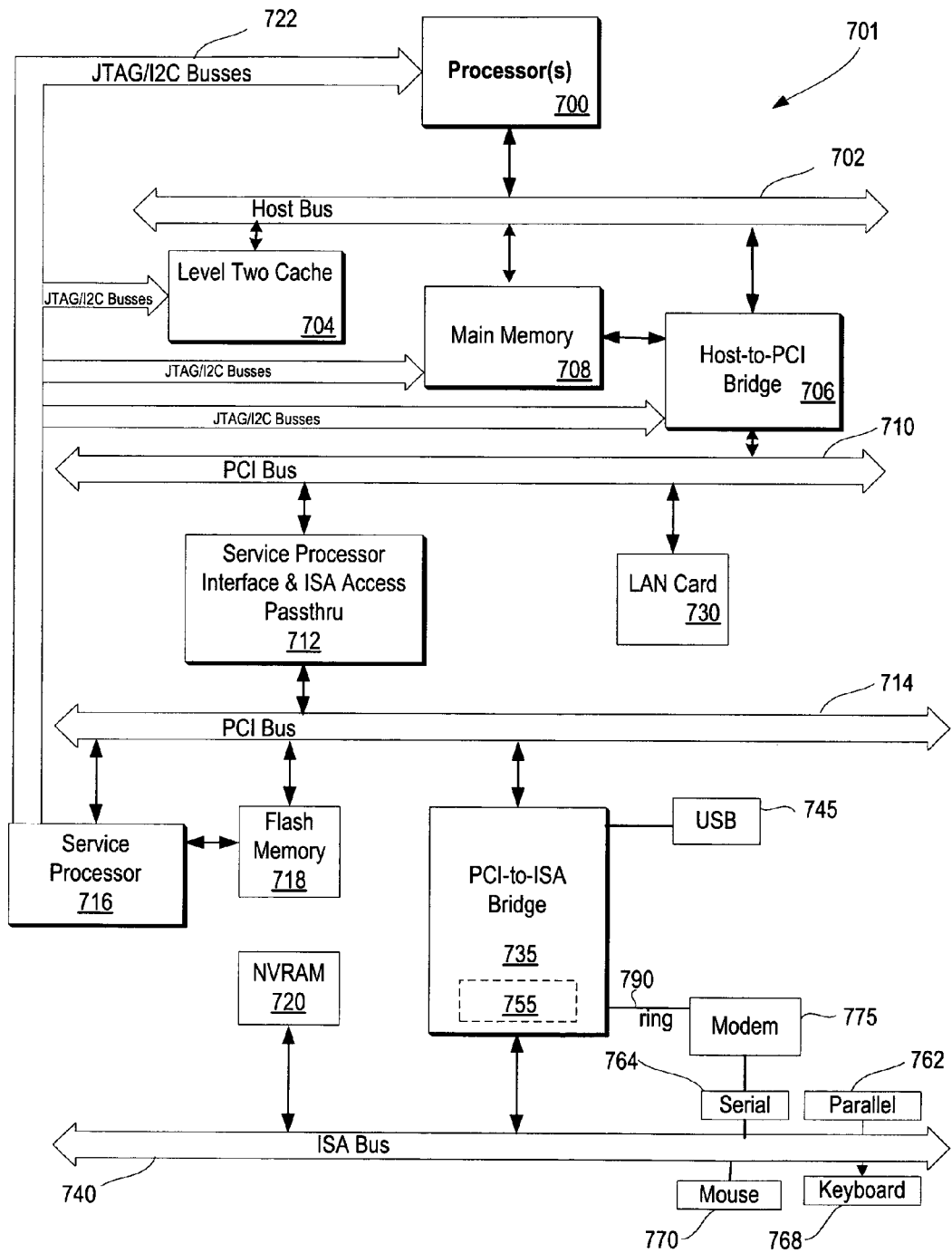
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for backing up data, said method comprising:
   initiating a backup, the backup including copying a plurality of data blocks from a first storage area to a second storage area;
   receiving a first write request during the backup, the first write request corresponding to a data block included in the plurality of data blocks;
   determining, during the backup, whether the data block has been copied to the second storage area; and
   logging, during the backup, the data block's location in response to determining that the data block has been copied.

2. The method as described in claim 1 wherein the determining further comprises:
   retrieving a read progress point, the read progress point corresponding to the progress of the backup; and
   comparing the read progress point to the data block's location.

3. The method as described in claim 1 further comprising:
   wherein the write request results in a changed data block at the data block's location;
   retrieving the data block's location from a log file; and
   copying the changed data block to the second storage area.

4. The method as described in claim 3 further comprising:
   receiving a second write request, the second write request corresponding to the changed data block;
   identifying whether the changed data block has been copied to the second storage area; and
   duplicating the changed data block in a temporary storage area in response to the identification.

5. The method as described in claim 4 further comprising:
   detecting whether the changed data block has been duplicated in the temporary storage area; and
   performing the copying using the temporary storage area.

6. The method as described in claim 3 further comprising:
   removing the data block's location from the log file after the copying.

7. The method as described in claim 1 wherein the plurality of data blocks is selected from the group consisting of a file, a file system, and a database.

8. An information handling system comprising:
   one or more processors;
   a memory accessible by the processors;
   one or more nonvolatile storage devices accessible by the processors; and
   a data backup tool for backing up data, the data backup tool comprising software code effective to:
      initiate a backup, the backup including copying a plurality of data blocks from a first storage area to a second storage area;
      receive a first write request during the backup, the first write request corresponding to a data block included in the plurality of data blocks;
      determine, during the backup, whether the data block has been copied to the second storage area; and
      log, during the backup, the data block's location in response to determining that the data block has been copied.

9. The information handling system as described in claim 8 wherein the software code is further effective to:
   retrieve a read progress point, the read progress point corresponding to the progress of the backup; and
   compare the read progress point to the data block's location.

10. The information handling system as described in claim 8 wherein the write request results in a changed data block at the data block's location, and wherein the software code is further effective to:
   retrieve the data block's location from a log file; and
   copy the changed data block to the second storage area.

11. The information handling system as described in claim 10 wherein the software code is further effective to:
   receive a second write request, the second write request corresponding to the changed data block;
   identify whether the changed data block has been copied to the second storage area; and
   duplicate the changed data block in a temporary storage area in response to the identification.

12. The information handling system as described in claim 11 wherein the software code is further effective to:
   detect whether the changed data block has been duplicated in the temporary storage area; and
   perform the copying using the temporary storage area.

13. The information handling system as described in claim 10 wherein the software code is further effective to:
   remove the data block's location from the log file after the copying.

14. A computer program product stored on a computer operable media for backing up data, said computer program product comprising:
   means for initiating a backup, the backup including copying a plurality of data blocks from a first storage area to a second storage area;
   means for receiving a first write request during the backup, the first write request corresponding to a data block included in the plurality of data blocks;
   means for determining, during the backup, whether the data block has been copied to the second storage area; and
   means for logging, during the backup, the data block's location in response to determining that the data block has been copied.

15. The computer program product as described in claim 14 wherein the means for determining further comprises:
   means for retrieving a read progress point, the read progress point corresponding to the progress of the backup; and
   means for comparing the read progress point to the data block's location.

16. The computer program product as described in claim 14 further comprising:
   wherein the write request results in a changed data block at the data block's location;
   means for retrieving the data block's location from a log file; and
   means for copying the changed data block to the second storage area.

17. The computer program product as described in claim 16 further comprising:
   means for receiving a second write request, the second write request corresponding to the changed data block;
   means for identifying whether the changed data block has been copied to the second storage area; and
   means for duplicating the changed data block in a temporary storage area in response to the identification.

18. The computer program product as described in claim 17 further comprising:
   means for detecting whether the changed data block has been duplicated in the temporary storage area; and
   means for performing the copying using the temporary storage area.

19. The computer program product as described in claim 16 further comprising:
   means for removing the data block's location from the log file after the copying.

20. The computer program product as described in claim 14 wherein the plurality of data blocks is selected from the group consisting of a file, a file system, and a database.

* * * * *